United States Patent [19]
Kohno et al.

[11] Patent Number: 5,872,660
[45] Date of Patent: Feb. 16, 1999

[54] TAKING LENS SYSTEM

[75] Inventors: Tetsuo Kohno, Toyonaka; Takashi Okada, Osaka, both of Japan

[73] Assignee: Minolta Co., Ltd., Osaka, Japan

[21] Appl. No.: 822,723

[22] Filed: Mar. 24, 1997

[30] Foreign Application Priority Data

Mar. 27, 1996 [JP] Japan .................................. 8-071738

[51] Int. Cl.⁶ .................................................. G02B 15/14
[52] U.S. Cl. .......................................................... 359/689
[58] Field of Search .................................. 359/689, 683, 359/676

[56] References Cited

U.S. PATENT DOCUMENTS

| | | | |
|---|---|---|---|
| 4,838,666 | 6/1989 | Shiraishi | 359/689 |
| 5,015,077 | 5/1991 | Ueda | 359/689 |
| 5,262,897 | 11/1993 | Kawamura | 359/689 |
| 5,550,679 | 8/1996 | Sugawara | 359/689 |

FOREIGN PATENT DOCUMENTS 6331891  12/1994  Japan .

*Primary Examiner*—Scott J. Sugarman
*Attorney, Agent, or Firm*—Price, Gess & Ubell

[57] ABSTRACT

The object of the present invention is to provide a taking lens system that has an exit pupil located at or close to infinity and has a short total length. In order to achieve said object, the present invention comprises, from the object side, a main optical system comprising a first lens unit having a negative refractive power and a second lens unit having a positive refractive power, and a condenser lens that is located between said main optical system and the image plane and has a positive refractive power.

17 Claims, 6 Drawing Sheets

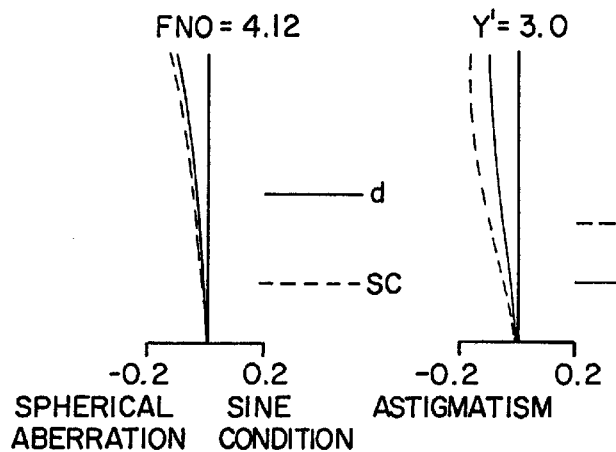
FIG. 4A FNO=4.12 SPHERICAL ABERRATION SINE CONDITION
FIG. 4B Y'=3.0 ASTIGMATISM
FIG. 4C Y'=3.0 DISTORTION %
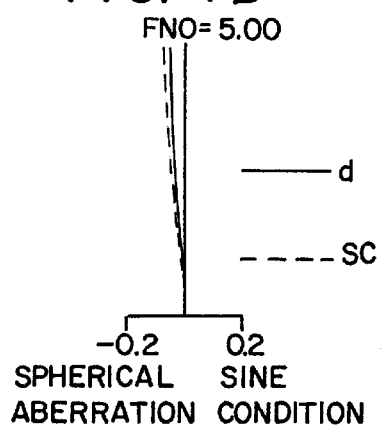
FIG. 4D FNO=5.00 SPHERICAL ABERRATION SINE CONDITION
FIG. 4E Y'=3.0 ASTIGMATISM
FIG. 4F Y'=3.0 DISTORTION %
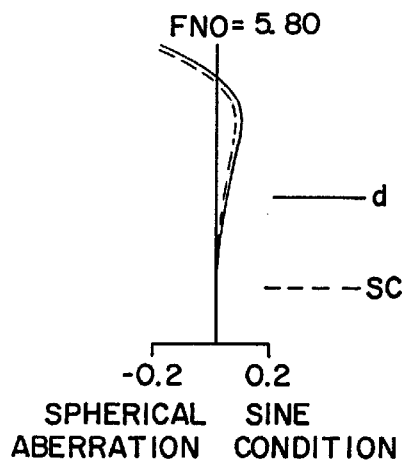
FIG. 4G FNO=5.80 SPHERICAL ABERRATION SINE CONDITION
FIG. 4H Y'=3.0 ASTIGMATISM
FIG. 4I Y'=3.0 DISTORTION %

FNO = 4.10
—— d
---- SC
-0.2  0.2
SPHERICAL  SINE
ABERRATION CONDITION

Y'= 3.0
---- DM
—— DS
-0.2  0.2
ASTIGMATISM

Y'= 3.0
-2.0  2.0
DISTORTION %

FNO= 4.85
—— d
---- SC
-0.2  0.2
SPHERICAL  SINE
ABERRATION CONDITION

Y'= 3.0
---- DM
—— DS
-0.2  0.2
ASTIGMATISM

Y'= 3.0
-2.0  2.0
DISTORTION %

FNO= 5.75
—— d
---- SC
-0.2  0.2
SPHERICAL  SINE
ABERRATION CONDITION

Y'= 3.0
---- DM
—— DS
-0.2  0.2
ASTIGMATISM

Y'= 3.0
-2.0  2.0
DISTORTION %

TAKING LENS SYSTEM

BACKGROUND OF THE INVENTION

1. Field of the Invention

The present invention pertains to a taking lens system, and more particularly to a compact taking lens system that employs a solid-state image pickup element and is suitable for a taking device.

2. Description of the Related Art

In cameras such as video or television cameras that perform taking of an object by receiving, via a solid-state image pickup element in which multiple light receiving elements are arranged in rows, image light rays that exit the taking lens system, a light-converging microlens is mounted on the light entry surface side of the light receiving elements in order to increase their photoreceptive efficiency. To increase (the level of light convergence by this microlens, it is desirable for the light rays that strike the microlens to be parallel to its optical axis. For that purpose, it is necessary for the exit pupil of the taking lens system to be located at or close to infinity, or in other words, for the taking lens system to be essentially telecentric.

On the other hand, it is preferred, from the standpoint of reducing the camera size, to shorten the total length of the taking lens system. However, when the taking lens system is shortened, the exit pupil of said taking lens system becomes close to the image plane. If this happens, the off-axial light rays strike the microlens at an angle. As a result, the degree of light convergence by the microlens is reduced, so that the brightnesses of the central and peripheral areas of the image that is exposed onto the solid-state image pickup element become different.

SUMMARY OF THE INVENTION

The object of the present invention is to provide a taking lens system that has an exit pupil located at or close to infinity and has a short total length.

In order to achieve said object, the present invention comprises, from the object side, a main optical system comprising a first lens unit having a negative refractive power and a second lens unit having a positive refractive power, and a condenser lens that is located between said main optical system and the image plane and has a positive refractive power.

BRIEF DESCRIPTION OF THE DRAWINGS

The object and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 4A is a drawing showing spherical aberration and sine condition in the shortest focal length condition in the first embodiment.

FIG. 4B is a drawing showing astigmatism in the shortest focal length condition in the first embodiment.

FIG. 4C is a drawing showing distortion in the shortest focal length condition in the first embodiment.

FIG. 4D is a drawing showing spherical aberration and sine condition in the middle focal length condition in the first embodiment.

FIG. 4E is a drawing showing astigmatism in the middle focal length condition in the first embodiment.

FIG. 4F is a drawing showing distortion in the middle focal length condition in the first embodiment.

FIG. 4G is a drawing showing spherical aberration and sine condition in the longest focal length condition in the first embodiment.

FIG. 4H is a drawing showing astigmatism in the longest focal length condition in the first embodiment.

FIG. 4I is a drawing showing distortion in the longest focal length condition in the first embodiment.

DETAILED DESCRIPTION OF THE PREFERRED EMBODIMENTS

Figure 1:
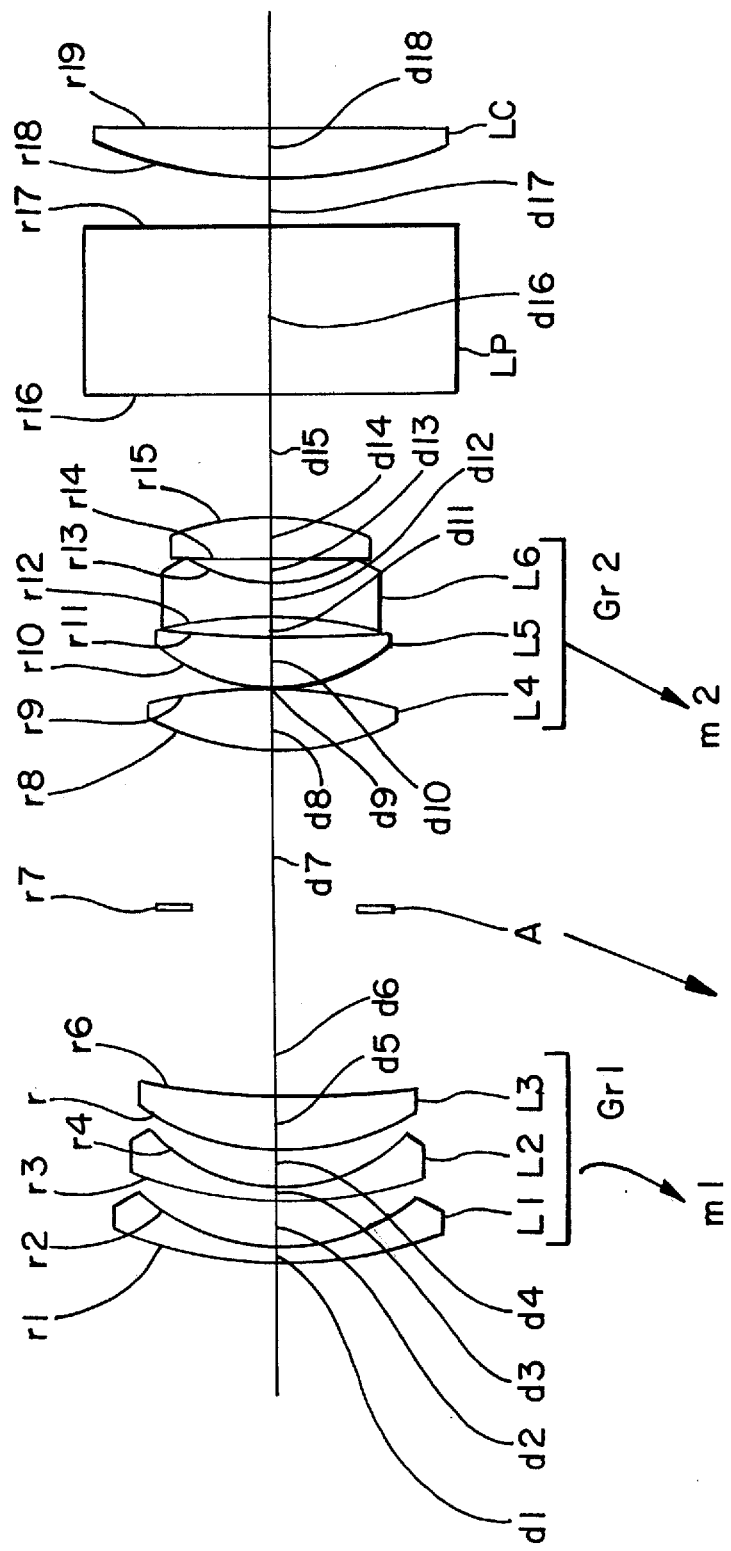
FIG. 1 shows the construction of the lens system pertaining to the first embodiment of the present invention, said lens system being in focus with the filmed object at infinity.
Figure 2:
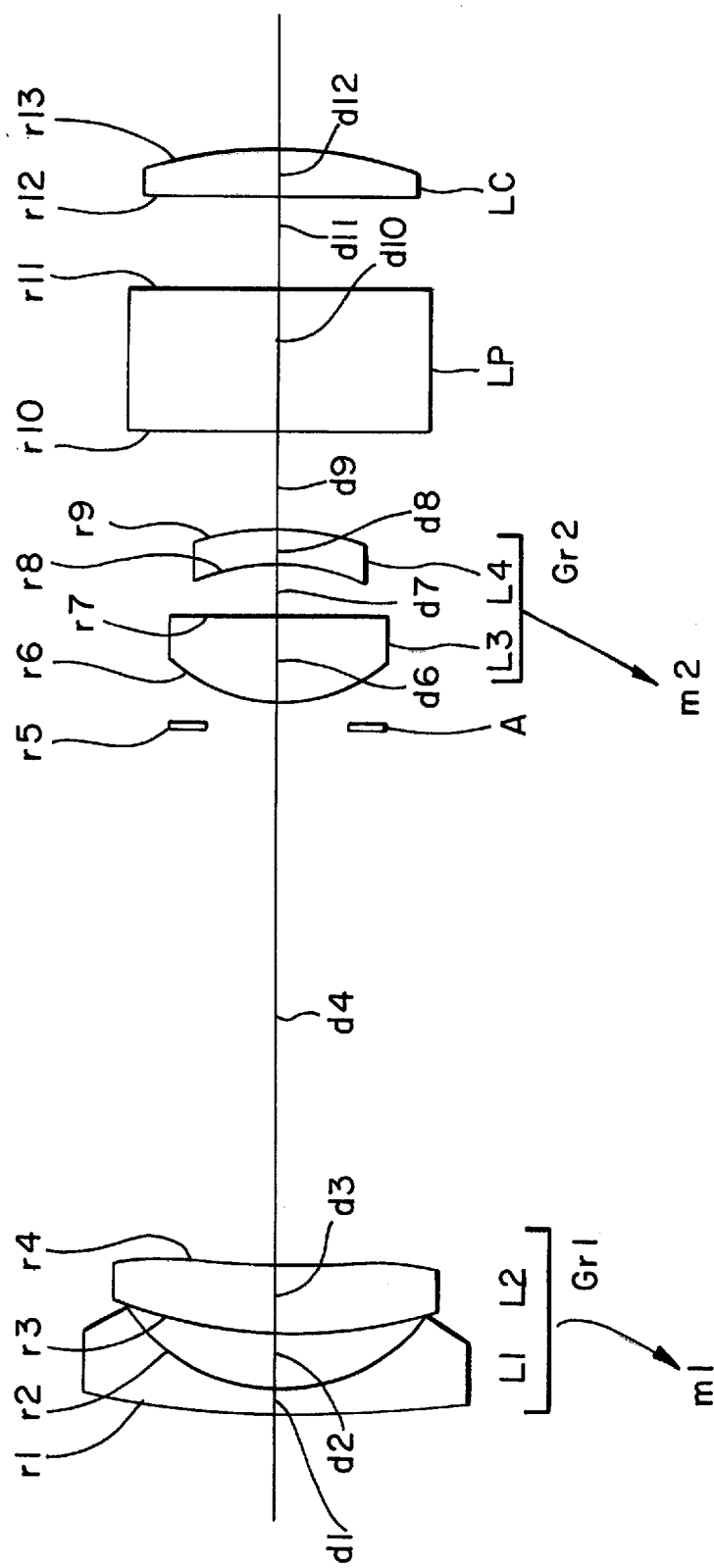
FIG. 2 shows the construction of the lens system pertaining to the second embodiment of the present invention, said lens system being in focus with the filmed object at infinity.
Figure 3:
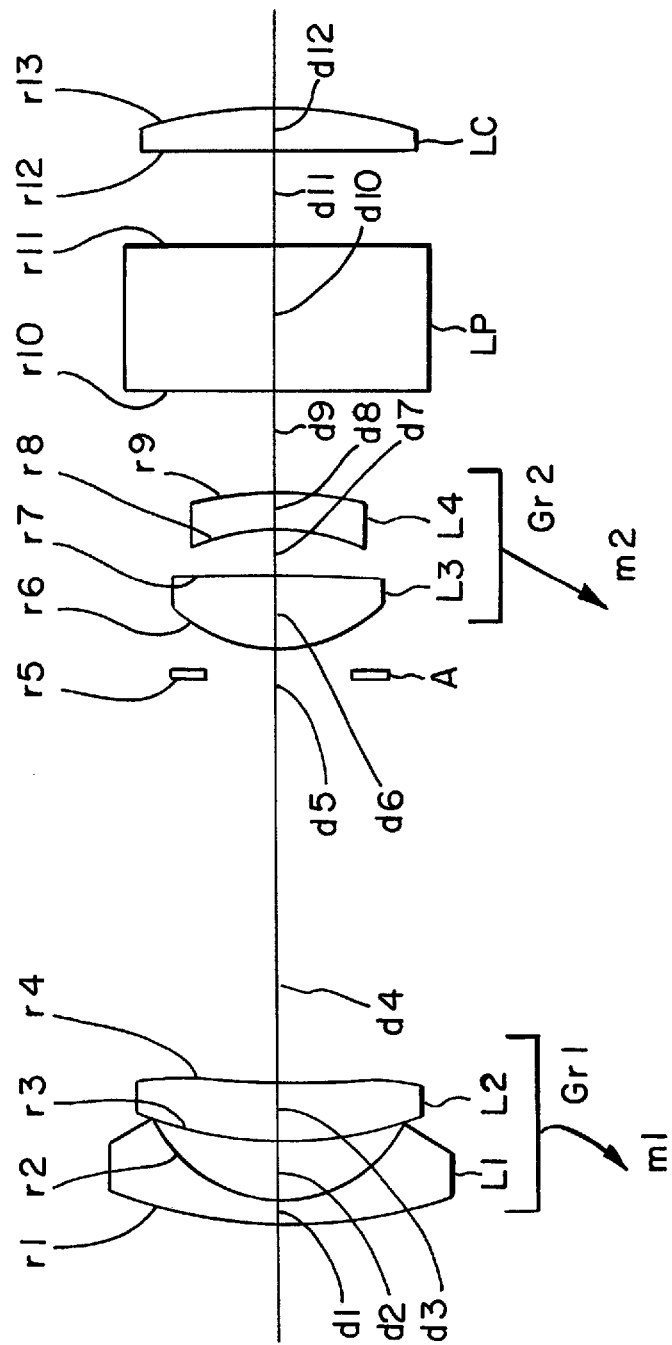
FIG. 3 shows the construction of the lens system pertaining to the third embodiment of the present invention, said lens system being in focus with the filmed object at infinity.
Figure 5A:
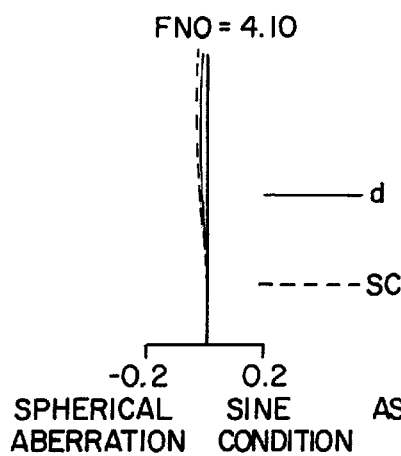
FIG. 5A is a drawing showing spherical aberration and sine condition in the shortest focal length condition in the second embodiment.
Figure 5B:
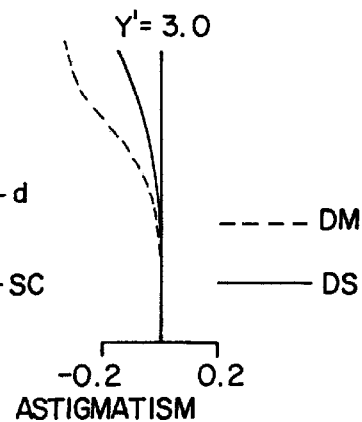
FIG. 5B is a drawing showing astigmatism in the shortest focal length condition in the second embodiment.
Figure 5C:
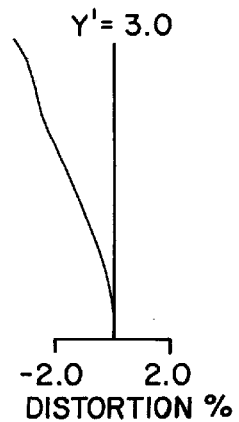
FIG. 5C is a drawing showing distortion in the shortest focal length condition in the second embodiment.
Figure 5D:
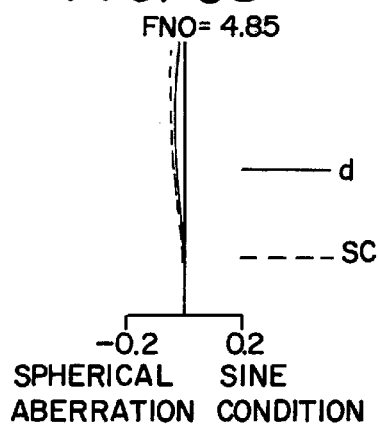
FIG. 5D is a drawing showing spherical aberration and sine condition in the middle focal length condition in the second embodiment.
Figure 5E:
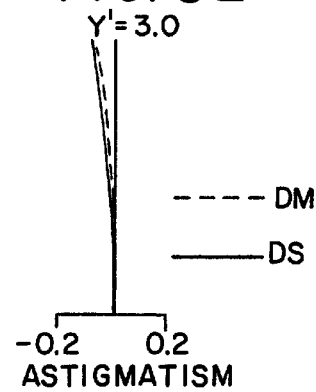
FIG. 5E is a drawing showing astigmatism in the middle focal length condition in the second embodiment.
Figure 5F:
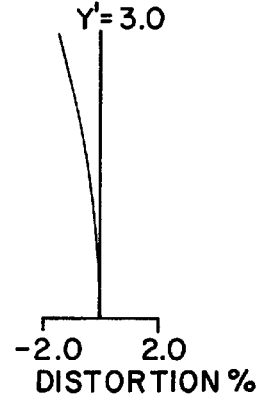
FIG. 5F is a drawing showing distortion in the middle focal length condition in the second embodiment.
Figure 5G:
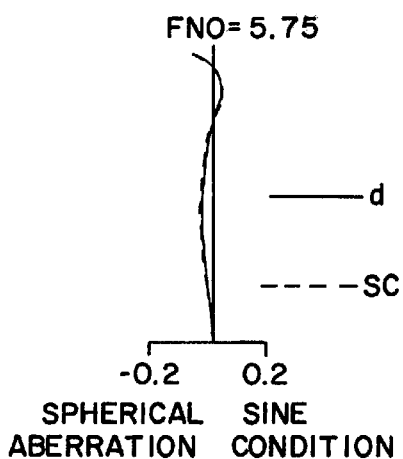
FIG. 5G is a drawing showing spherical aberration and sine condition in the longest focal length condition in the second embodiment.
Figure 5H:
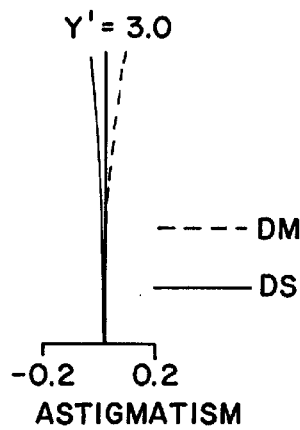
FIG. 5H is a drawing showing astigmatism in the longest focal length condition in the second embodiment.
Figure 5I:
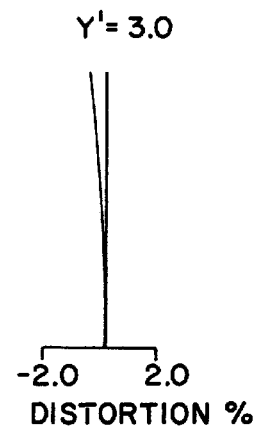
FIG. 5I is a drawing showing distortion in the longest focal length condition in the second embodiment.
Figure 6A:
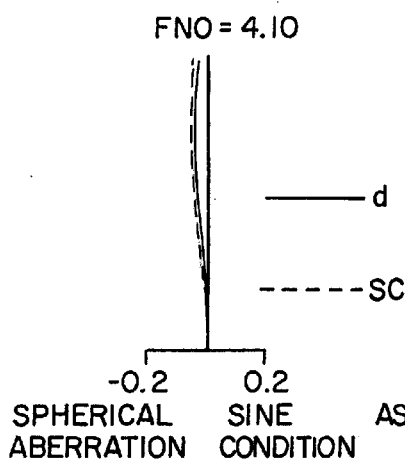
FIG. 6A is a drawing showing spherical aberration and sine condition in the shortest focal length condition in the third embodiment.
Figure 6B:
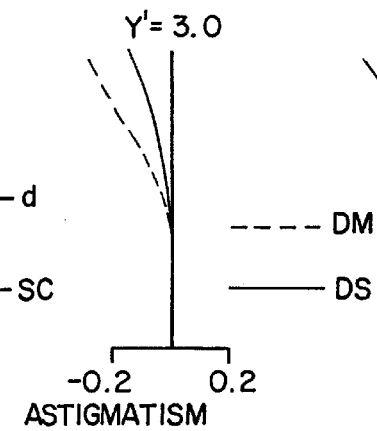
FIG. 6B is a drawing showing astigmatism in the shortest focal length condition in the third embodiment.
Figure 6C:
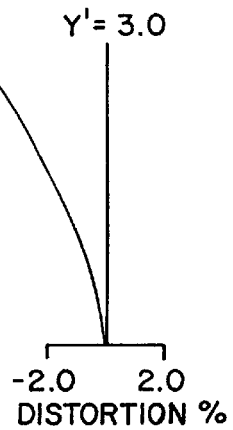
FIG. 6C is a drawing showing distortion in the shortest focal length condition in the third embodiment.
Figure 6D:
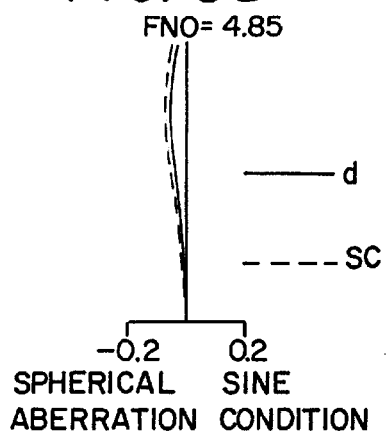
FIG. 6D is a drawing showing spherical aberration and sine condition in the middle focal length condition in the third embodiment.
Figure 6E:
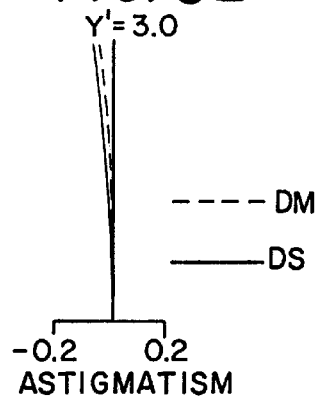
FIG. 6E is a drawing showing astigmatism in the middle focal length condition in the third embodiment.
Figure 6F:
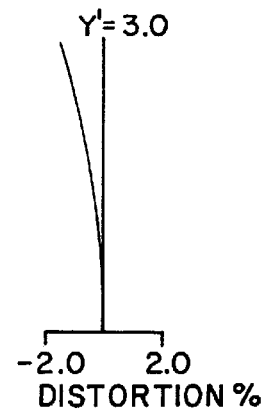
FIG. 6F is a drawing showing distortion in the middle focal length condition in the third embodiment.
Figure 6G:
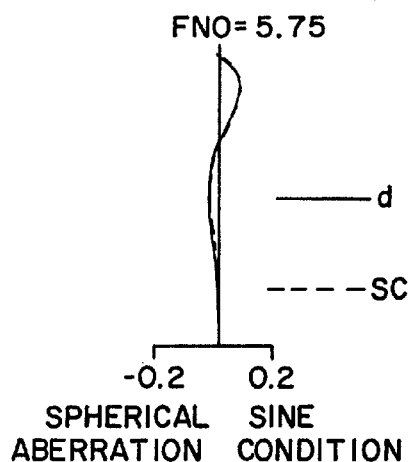
FIG. 6G is a drawing showing spherical aberration and sine condition in the longest focal length condition in the third embodiment.
Figure 6H:
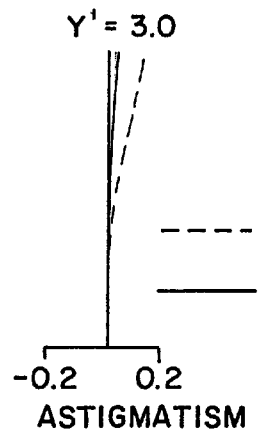
FIG. 6H is a drawing showing astigmatism in the longest focal length condition in the third embodiment.
Figure 6I:
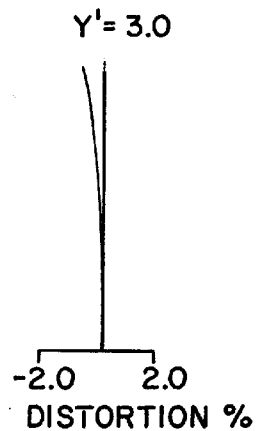
FIG. 6I is a drawing showing distortion in the longest focal length condition in the third embodiment.

FIGS. 1 through 3 show the arrangement of lenses in the first through third embodiments of the zoom lens system pertaining to the present invention where the lens system is in focus with the filmed object at infinity. In each drawing, arrows m1 and m2 provide a simple indication of the movement of lens units Gr1 and Gr2 respectively during zooming from the shortest focal length position to the longest focal length position.

Each of the first through third embodiments comprises, from the object side, a main optical system comprising first lens unit Gr1 having a negative refractive power, aperture A and second lens unit Gr2 having a positive refractive power; low-pass filter LP; and condenser lens LC having a positive refractive power.

During zooming from the shortest focal length position to the longest focal length position, first lens unit Gr1 moves first toward the image side from the shortest focal length position to the middle focal length position, and then back toward the object side from the middle focal length position to the longest focal length position. Aperture A and second lens unit Gr2, by contrast, move in a single direction toward the object side from the shortest focal length position to the longest focal length position.

First lens unit Gr1 in the first embodiment comprises, from the object side, negative meniscus lens L1 having a convex surface on the object side, negative meniscus lens L2 having a convex surface on the object side, and positive meniscus lens L3 having a convex surface on the object side.

Second lens unit Gr2 in the first embodiment comprises, from the object side, lens L4 having convex surfaces on both sides, positive meniscus lens L5 having a convex surface on the object side, lens L6 having concave surfaces on both sides, and lens L7 having convex surfaces on both sides.

Condenser lens LC in the first embodiment has a convex surface on the object side and a flat surface on the other side.

First lens unit Gr1 in the second embodiment comprises, from the object side, negative meniscus lens L1 having a convex surface on the object side and positive meniscus lens L2 having a convex surface on the object side.

Second lens unit Gr2 in the second embodiment comprises, from the object side, positive meniscus lens L3 having a convex surface on the object side and negative meniscus lens L4 having a concave surface on the object side.

Condenser lens LC in the second embodiment has a flat surface on the object side and a convex surface on the other side.

First lens unit Gr1 in the third embodiment comprises, from the object side, negative meniscus lens L1 having a convex surface on the object side and positive meniscus lens L2 having a convex surface on the object side.

Second lens unit Gr2 in the third embodiment comprises, from the object side, lens L3 having a convex surface on the object side and negative meniscus lens L4 having a concave surface on the object side.

Condenser lens LC in the third embodiment has a flat surface on the object side and a convex surface on the other side.

In the present invention, by having a condenser lens located between the main optical system and the image plane, the exit pupil of the taking optical system may be positioned farther away from the image plane than it would be if there were no condenser lens at said position. The refractive power of the condenser lens should be set so as to be appropriate relative to the position of the exit pupil of the main optical system. By increasing the refractive power of the condenser lens as the position of the exit pupil of the main optical system approaches the image plane, the action of the condenser lens in moving the position of the exit pupil of the taking optical system farther away from the image plane may be strengthened. Where the taking lens system is a zoom lens system, as in the embodiments described above, the exit pupil moves along the optical axis during zooming. Therefore, the position of the exit pupil in the shortest focal length condition and the position of the exit pupil in the longest focal length condition must be adjusted.

In addition, it is preferred that at least one surface of the condenser lens be aspherical. If at least one surface of the condenser lens is aspherical, various types of aberrations, particularly distortion and curvature of field, may be corrected with high accuracy.

The conditions that it is desirable for the taking optical system of the present invention to meet will now be explained.

It is desirable for the taking lens system equipped with a main optical system comprising a first lens unit having a negative refractive power and a second lens unit having a positive refractive power and a condenser lens located between said main optical system and the image plane and having a positive refractive power to meet condition (1) and/or condition (2) below:

$$-6.0 < \phi1/\phi C < -1.2 \qquad (1)$$

$$1.2 < \phi2/\phi C < 6.0 \qquad (2)$$

where, $\phi1$: refractive power of the first lens unit
$\phi2$: refractive power of the second lens unit
$\phi C$: refractive power of the condenser lens Condition (1) is a condition that prescribes the ratio of the first lens unit refractive power, which significantly influences the position of the exit pupil of the main optical system, to the condenser lens refractive power. When the refractive power of the first lens unit becomes so strong that it exceeds the upper limit of condition (1), although the exit pupil does move away from the image plane, it becomes difficult to correct various types of aberrations, particularly negative distortion and spherical aberration. Conversely, when the refractive power of the first lens unit becomes so weak that it exceeds the lower limit of condition (1), the exit pupil of the main optical system moves close to the image plane, and consequently it becomes necessary to strengthen the refractive power of the condenser lens. However, when the refractive power of the condenser lens is strengthened, it becomes difficult for the main optical system to correct various types of aberrations that occur due to the presence of the condenser lens, particularly negative distortion and tilting of the image plane in the positive direction.

Condition (2) is a condition that prescribes the ratio of the second lens unit refractive power, which determines together with the first lens unit refractive power the position of the exit pupil of the main optical system, to the refractive power of the condenser lens. When the refractive power of the second lens unit becomes so strong that it exceeds the upper limit of condition (2), the exit pupil of the main optical system moves close to the image plane, and consequently it becomes necessary to strengthen the refractive power of the condenser lens. However, when the refractive power of the condenser lens is strengthened, it becomes difficult for the main optical system to correct various types of aberrations that occur due to the condenser lens, particularly negative distortion and tilting of the image plane in the positive direction. Conversely, when the refractive power of the second lens unit becomes so weak that it exceeds the lower limit of condition (2), while the exit pupil moves away from the image plane, the size of the main optical system increases and the goal of compactness can no longer be achieved.

It is also preferred for condition (3) below to be met:

$$Y' < LBW \quad (3)$$

where,

LBW: distance from the last surface of the main optical system to the image plane in the shortest focal length condition Y': Largest image height If the distance from the last surface of the main optical system to the image plane becomes so short that it falls below the range defined in condition (3), it becomes difficult to position elements such as the low-pass filter between the last surface of the main optical system and the image plane.

Moreover, it is preferred for condition (4) below to be met as well:

$$1.8 < bw/aw < 12 \quad (4)$$

where, bw: distance from the image plane to the exit pupil in the shortest focal length condition where a condenser lens is present aw: distance from the image plane to the exit pupil in the shortest focal length position where a condenser lens is not present Condition (4) governs the changes in the position of the exit pupil that occur due to the condenser lens. If the lower limit of condition (4) is exceeded, because the exit pupil would be relatively far away from the image plane even if a condenser lens were not present, incorporating a condenser lens does not have much effect. Because the fact that the exit pupil would be relatively far away from the image plane even if a condenser lens were not present means that the total length of the lens system will be large, compactness of the taking optical system cannot be achieved. Conversely, if the upper limit of condition (4) is exceeded, the action of the condenser lens in moving the position of the exit pupil farther away from the image plane becomes too strong. When the action of the condenser lens in moving the position of the exit pupil away from the image plane becomes strong, various types of aberrations that occur due to the presence of the condenser lens, particularly negative distortion and tilting of the image plane in the positive direction, increase, and it becomes difficult for the main optical system to correct them.

It is also preferred for the following conditions (5) and/or (6) to be met:

$$0.5 < |\phi 1/\phi T| < 5.0 \quad (5)$$

$$0.5 < |\phi 2/\phi T| < 5.0 \quad (6)$$

where,

φ1: refractive power of the first lens unit

φ2: refractive power of the second lens unit

φT: refractive power of the main optical system in the longest focal length condition Conditions (5) and (6) are conditions to ensure the compactness of the main optical system. In a conventional taking lens system that does not incorporate a condenser lens, the exit pupil is distanced from the image plane by weakening the refractive powers of the lens units and lengthening the back focus. As a result, conventional taking lens systems are large. By contrast, because the present invention allows the exit pupil to be distanced from the image plane by incorporating a condenser lens, the refractive powers of the lens units in the main optical system may be made stronger than those in a conventional taking lens system, and the taking lens system may consequently be made compact. If the refractive powers of the first and second lens units become so strong that they exceed the upper limits of conditions (5) or (6), while the taking lens system may still be made compact, the various aberrations that occur due to the presence of the two lens units become too large. In particular, if the refractive power of the first lens unit becomes too strong, negative distortion becomes excessively large and spherical aberration tends to tilt toward the positive side in the aberration diagram, and these problems are difficult to correct by means of other lenses. If the refractive power of the second lens unit becomes too strong, negative aberration becomes excessively large and spherical aberration tends to tilt toward the negative side in the aberration diagram. These problems are also difficult to correct by means of other lenses.

As explained above, because the exit pupil is distanced far away from the image plane in the present invention, even in the case where it is applied in a camera employing a solid-state image pickup element, variations in image brightness between the central area and the peripheral areas of the image exposed onto the solid-state image pickup element may be prevented. In addition, because the refractive powers of the various lens units may be strengthened, the taking lens system as a whole may be made shorter and more compact.

Embodiments 1 through 3 of the taking lens system pertaining to the present invention are shown below. In each embodiment, f represents the focal length of the entire system; F NO. represents the F number; ri (i=1, 2, 3, . . . ) represents the radius of curvature of the ith surface from the object side; di (i=1, 2, 3, . . . ) represents the ith axial distance from the object side; and Ni (i=1, 2, 3, . . . ), and vi (i=1, 2, 3, . . . ) represent the refractive index and the Abbe number with regard to the d line of the ith lens from the object side, respectively.

In the tables pertaining to the embodiments, the surfaces marked with asterisks in the radius of curvature column are aspherical, and are defined by the following equation that represents the aspherical surface configuration.

$$Y = \frac{C \cdot X^2}{1 + \sqrt{1 - \epsilon \cdot X^2 \cdot C^2}} + \sum_i A_i X^i$$

where,

X: height in the direction perpendicular to the optical axis

Y: amount of displacement from the reference surface along the optical axis

C: paraxial curvature

ε: quadric surface parameter

Ai: the ith aspherical coefficient

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

TABLE 1

<First Embodiment> f = 6.2~10.1~16.1   FNO = 4.1~5.0~5.8

| | Radius | Axial Surface Distance | | Refractive Index | Abbe Number |
|---|---|---|---|---|---|
| r1 | 9.715 | | | | |
| | | d1 | 0.530 | N1 1.77551 | v1 37.90 |
| r2 | 4.889 | | | | |
| | | d2 | 1.000 | | |
| r3 | 8.623 | | | | |
| | | d3 | 0.350 | N2 1.71300 | v2 53.93 |
| r4 | 3.826 | | | | |
| | | d4 | 0.900 | | |
| r5 | 5.546 | | | | |
| | | d5 | 1.200 | N3 1.67339 | v3 29.25 |
| r6* | 12.446 | | | | |
| | | d6 | 4.458~0.852~0.801 | | |
| r7 | ∞ | | | | |
| | | d7 | 3.700~3.000~0.500 | | |
| r8 | 5.871 | | | | |
| | | d8 | 1.350 | N4 1.58913 | v4 61.11 |
| r9 | −11.302 | | | | |
| | | d9 | 0.100 | | |
| r10 | 3.918 | | | | |
| | | d10 | 1.250 | N5 1.51680 | v5 64.20 |
| r11 | 37.865 | | | | |
| | | d11 | 0.400 | | |
| r12 | −9.897 | | | | |
| | | d12 | 0.800 | N6 1.80741 | v6 31.59 |
| r13 | 3.500 | | | | |
| | | d13 | 0.600 | | |
| r14 | 58.470 | | | | |
| | | d14 | 0.900 | N7 1.59551 | v7 39.22 |
| r15 | −7.371 | | | | |
| | | d15 | 3.000~6.252~11.302 | | |
| r16 | ∞ | | | | |
| | | d16 | 4.000 | N8 1.51680 | v8 64.20 |
| r17 | ∞ | | | | |
| | | d17 | 1.000 | | |
| r18 | 11.745 | | | | |
| | | d18 | 1.100 | N9 1.51680 | v6 64.20 |
| r19 | ∞ | | | | |

Aspherical Coefficient r6:  $\epsilon = 1.0000$
   $A4 = -0.10802 \times 10^{-2}$
   $A6 = 0.15043 \times 10^{-4}$
   $A8 = -0.13724 \times 10^{-4}$
   $A10 = 0.12976 \times 10^{-5}$
   $A12 = -0.57816 \times 10^{-7}$

TABLE 2

<Second Embodiment> f = 6.1~9.7~17.5   FNO = 4.1~4.9~5.8

| | Radius | Axial Surface Distance | | Refractive Index | Abbe Number |
|---|---|---|---|---|---|
| r1 | 33.297 | | | | |
| | | d1 | 0.600 | N1 1.61293 | v1 36.96 |
| r2 | 4.725 | | | | |
| | | d2 | 1.900 | | |
| r3* | 15.092 | | | | |
| | | d3 | 1.900 | N2 1.84666 | v2 23.82 |
| r4* | 39.019 | | | | |
| | | d4 | 16.006~7.538~1.000 | | |
| r5 | ∞ | | | | |
| | | d5 | 0.800 | | |
| r6 | 4.532 | | | | |
| | | d6 | 3.600 | N3 1.61800 | v3 63.39 |
| r7 | 182.262 | | | | |
| | | d7 | 1.500 | | |
| r8* | −4.478 | | | | |
| | | d8 | 1.000 | N4 1.84666 | v4 23.82 |
| r9* | −6.737 | | | | |
| | | d9 | 3.000~5.747~11.784 | | |
| r10 | ∞ | | | | |
| | | d10 | 4.300 | N5 1.51680 | v5 64.20 |
| r11 | ∞ | | | | |
| | | d11 | 2.800 | | |
| r12 | ∞ | | | | |
| | | d12 | 1.200 | N6 1.58913 | v6 61.11 |
| r13 | −14.546 | | | | |

Aspherical Coefficient r3:  $\epsilon = 1.0000$
   $A4 = -0.95230 \times 10^{-4}$
   $A6 = 0.45464 \times 10^{-5}$
   $A8 = 0.16971 \times 10^{-6}$
   $A10 = 0.13904 \times 10^{-8}$
   $A12 = 0.10324 \times 10^{-10}$
r4:  $\epsilon = 1.0000$
   $A4 = -0.56546 \times 10^{-3}$
   $A6 = -0.69129 \times 10^{-2}$
   $A8 = -0.25933 \times 10^{-8}$
   $A10 = -0.54702 \times 10^{-5}$
   $A12 = -0.19302 \times 10^{-10}$
r8:  $\epsilon = 1.0000$
   $A4 = 0.42970 \times 10^{-2}$
   $A6 = 0.29909 \times 10^{-3}$
   $A8 = 0.85680 \times 10^{-5}$
   $A10 = 0.76361 \times 10^{-8}$
   $A12 = 0.90722 \times 10^{-10}$
r9:  $\epsilon = 1.0000$
   $A4 = 0.47258 \times 10^{-2}$
   $A6 = 0.34027 \times 10^{-3}$
   $A8 = 0.15656 \times 10^{-4}$
   $A10 = 0.12088 \times 10^{-7}$
   $A12 = 0.92646 \times 10^{-10}$

TABLE 3

<Third Embodiment> f = 6.2~9.7~17.5   FNO = 4.1~4.9~5.8

| | Radius | Axial Surface Distance | | Refractive Index | Abbe Number |
|---|---|---|---|---|---|
| r1 | 15.113 | | | | |
| | | d1 | 0.600 | N1 1.61720 | v1 54.00 |
| r2 | 3.892 | | | | |
| | | d2 | 1.800 | | |
| r3* | 10.951 | | | | |
| | | d3 | 1.500 | N2 1.84666 | v2 23.82 |
| r4* | 16.583 | | | | |
| | | d4 | 11.948~5.714~0.900 | | |
| r5 | ∞ | | | | |
| | | d5 | 0.800 | | |
| r6 | 3.979 | | | | |
| | | d6 | 2.200 | N3 1.61800 | v3 63.39 |
| r7 | −56.020 | | | | |
| | | d7 | 1.400 | | |
| r8* | −3.873 | | | | |
| | | d8 | 1.000 | N4 1.83350 | v4 21.00 |
| r9* | −6.534 | | | | |
| | | d9 | 3.000~5.704~11.644 | | |
| r10 | ∞ | | | | |
| | | d10 | 4.300 | N5 1.51680 | v5 64.20 |
| r11 | ∞ | | | | |
| | | d11 | 2.800 | | |

TABLE 3-continued

<Third Embodiment>

| r12 | ∞ | | | | |
|---|---|---|---|---|---|
| | | d12 1.200 | N6 1.58913 | v6 61.11 | |
| r13* | −14.546 | | | | |

Aspherical Coefficient r3: ε = 1.0000
A4 = −0.43587 × 10$^{-3}$
A6 = 0.84194 × 10$^{-5}$
A8 = 0.39179 × 10$^{-6}$
A10 = 0.34054 × 10$^{-8}$
A12 = 0.14021 × 10$^{-10}$ r4: ε = 1.0000
A4 = −0.12370 × 10$^{-3}$
A6 = −0.18644 × 10$^{-4}$
A8 = −0.56261 × 10$^{-6}$
A10 = −0.79166 × 10$^{-8}$
A12 = −0.23214 × 10$^{-10}$ r8: ε = 1.0000
A4 = 0.56124 × 10$^{-2}$
A6 = 0.24860 × 10$^{-3}$
A8 = 0.19115 × 10$^{-4}$
A10 = 0.22904 × 10$^{-7}$
A12 = 0.33310 × 10$^{-9}$ r9: ε = 1.0000
A4 = 0.64424 × 10$^{-2}$
A6 = 0.35386 × 10$^{-3}$
A8 = 0.44117 × 10$^{-4}$
A10 = 0.39756 × 10$^{-7}$
A12 = 0.34076 × 10$^{-9}$ r13: ε = 1.0000
A4 = −0.24105 × 10$^{-3}$
A6 = −0.18396 × 10$^{-6}$
A8 = −0.24052 × 10$^{-8}$
A10 = −0.41534 × 10$^{-12}$
A12 = −0.69890 × 10$^{-13}$

TABLE 4

| | First Embodiment | Second Embodiment | Third Embodiment |
|---|---|---|---|
| (1) $\phi 1/\phi c$ | −2.38 | −1.73 | −2.10 |
| (2) $\phi 2/\phi c$ | 3.01 | 2.35 | 2.95 |
| (3) LBw/Y' | 3.19 | 4.18 | 3.79 |
| (4) bw/aw | 2.23 | 2.65 | 3.17 |
| (5) $|\phi 1/\phi T|$ | 1.79 | 1.29 | 1.49 |
| (6) $|\phi 2/\phi T|$ | 2.26 | 1.76 | 2.10 |

What is claimed is:

1. A taking lens system comprising, from the object side:
a main optical system comprising a first lens unit having a negative refractive power, a second lens unit having a positive refractive power between and a diaphragm provided between said first and second lens units; and
a condenser lens that is located between said main optical system and the image plane and has a positive refractive power, said condenser lens being fixed in a direction parallel to an optical axis
wherein the following conditions are fulfilled:

$$-3.6 < \phi 1/\phi C < -1.2$$

Y'<LBW where $\phi 1$ is a refractive power of the first lens unit, $\phi C$ is a refractive power of the condenser lens, LBW is distance from the last surface of the main optical system to the image plane in the shortest focal length condition and Y' is largest image height.

2. A taking lens system as claimed in claim 1, wherein the following condition is fulfilled:

$$1.2 < \phi 2/\phi C < 6.0$$

where $\phi 2$ is refractive power of the second lens unit and $\phi C$ is refractive power of the condenser lens.

3. A taking lens system as claimed in claim 1, wherein the following condition is fulfilled:

$$1.8 < bw/aw < 12$$

where bw is distance from the image plane to the exit pupil in the shortest focal length condition where a condenser lens is present and aw is distance from the image plane to the exit pupil in the shortest focal length position where a condenser lens is not present.

4. A taking lens system as claimed in claim 1, wherein the following condition is fulfilled:

$$0.5 < |\phi 1/\phi T| < 5.0$$

where $\phi 1$ is refractive power of the first lens unit and $\phi T$ is refractive power of the main optical system in the longest focal length condition.

5. A taking lens system as claimed in claim 1, wherein the following condition is fulfilled:

$$0.5 < |\phi 2/\phi T| < 5.0$$

where $\phi 2$ is refractive power of the second lens unit and $\phi T$ is refractive power of the main optical system in the longest focal length condition.

6. A taking lens system as claimed in claim 1, wherein at least one optical surface of said condenser lens is an aspherical surface.

7. A taking lens system comprising, from the object side:
a main optical system comprising a first lens unit having a negative refractive power, a second lens unit having a positive refractive power and a diaphragm provided between said first and second lens unit; and
a condenser lens that is located between said main optical system and the image plane and has a positive refractive power, said condenser lens being fixed in a direction parallel to an optical axis,
wherein the following conditions are fulfilled:

$$1.2 < |\phi 2/\phi T| < 5.0$$

Y'<LBW where $\phi 2$ is a refractive power of the second lens unit, $\phi T$ is a refractive power of the main optical system in the longest focal length condition, LBW is a distance from the last surface of the main optical system to the image plane in the shortest focal length condition and Y' is the largest image height.

8. A taking lens system comprising, from the object side:
a main optical system comprising a first lens unit having a negative refractive power, a second lens unit having a positive refractive power and a diaphragm provided between said first and second lens units; and
a condenser lens that is located between said main optical system and the image plane and has a positive refractive power, said condenser lens being fixed in a direction parallel to an optical axis,
wherein the following conditions are fulfilled:

$1 < LBW/Y' < 6.0$ where LBW is a distance from the last surface of the main optical system to the image plane in the shortest focal length condition and Y' is a largest image height.

9. A zoom lens system comprising, from the object side:
a main optical system comprising a first lens unit having a negative refractive power, a second lens unit having a positive refractive power and a diaphragm provided between said first and second lens units; and
a condenser lens that is located between said main optical system and the image plane and has a positive refractive power, said condenser lens unit being stationary during zooming, and
wherein the following conditions are fulfilled:

$-3.6 < \phi1/\phi C < -12$ $Y' < LBW$ where $\phi$ is a refractive power of the first lens unit, $\phi C$ is a refractive power of the condenser lens, LBW is a distance from the last surface of the main optical system to the image plane in the shortest focal length condition and Y' is a largest image height.

10. A zoom lens system as claimed in claim 9, wherein the following condition is fulfilled:

$1.2 < \phi2/\phi C < 6.0$ where $\phi2$ is a refractive power of the second lens unit and $\phi C$ is a refractive power of the condenser lens.

11. A zoom lens system as claimed in claim 9, wherein the following condition is fulfilled:

$1.8 < bw/aw < 12$ where bw is a distance from the image plane to the exit pupil in the shortest focal length condition where a condenser lens is present and aw is a distance from the image plane to the exit pupil in the shortest focal length position where a condenser lens is not present.

12. A zoom lens system as claimed in claim 9, wherein the following condition is fulfilled:

$0.5 < |\phi1/\phi T| < 5.0$ where $\phi1$ is a refractive power of the first lens unit and and $\phi T$ is a refractive power of the main optical system in the longest focal length condition.

13. A zoom lens system as claimed in claim 9, wherein the following condition is fulfilled:

$0.5 < |\phi2/\phi T| < 5.0$ where $\phi2$ is a refractive power of the second lens unit and $\phi T$ is a refractive power of the main optical lens system in the longest focal length condition.

14. A zoom lens system comprising, from the object side:
a main optical system comprising a first lens unit having a negative refractive power, a second lens unit having a positive refractive power and a diaphragm provided between the first and second lens units; and
a condenser lens that is located between said main optical system and the image plane and has a positive refractive power, said condenser lens unit being stationary during zooming,
wherein the following conditions are fulfilled:

$1.2 < |\phi2/\phi T| < 5.0$ $Y' < LBW$ where $\phi2$ is a refractive power of the second lens unit, $\phi T$ is a refractive power of the main optical system in the longest focal length condition, LBW is a distance from the last surface of the main optical system to the image plane in the shortest focal length condition and Y' is a largest image height.

15. A zoom lens system comprising, from the object side:
a main optical system comprising a first lens unit having a negative refractive power, a second lens unit having a positive refractive power and a diaphragm provided between the first and second lens units; and
a condenser lens that is located between said main optical system and the image plane and has a positive refractive power, said condenser lens unit being stationary during zooming,
wherein a zooming is performed by varying a distance between said first and second lens units, and
wherein the following conditions are fulfilled:

$1 < LBW/Y' < 6.0$ where LBW is a distance from the last surface of the main optical system to the image plane in the shortest focal length condition and Y' is a largest image height.

16. A zoom lens system for a camera having a solid state image pick-up element comprising, from the object side:
a first lens unit having a negative refractive power;
a second lens unit having a positive refractive power, the first and second lens units movable during a zooming made of operation from a shortest focal length position to a longest focal length position;
a low pass filter; and
a condenser lens that is fixed during the zooming mode of operation and the following condition is fulfilled:

$|\phi2/\phi T| \geq 1.76.$ wherein $\phi2$ is the refractive power of the second lens unit and $\phi T$ is the refractive power of the zoom lens system in the longest focal length condition.

17. The zoom lens system of claim 16 wherein the condenser lens has an aspheric surface.

* * * * *